United States Patent
Abergel et al.

(10) Patent No.: US 11,416,973 B2
(45) Date of Patent: Aug. 16, 2022

(54) RADIOMETRIC CORRECTION IN IMAGE MOSAICING

(71) Applicant: Elta Systems Ltd., Ashdod (IL)

(72) Inventors: Shlomo Abergel, Ashdod (IL); Moshe Karakash, Rehovot (IL)

(73) Assignee: ELTA SYSTEMS LTD., Ashdod (IL)

( * ) Notice: Subject to any disclaimer, the term of this patent is extended or adjusted under 35 U.S.C. 154(b) by 56 days.

(21) Appl. No.: 17/123,981

(22) Filed: Dec. 16, 2020

(65) Prior Publication Data
US 2021/0183024 A1  Jun. 17, 2021

(30) Foreign Application Priority Data
Dec. 17, 2019  (IL) .......................... 271518

(51) Int. Cl.
*G06T 5/00* (2006.01)
*G06T 3/40* (2006.01)
*G06T 5/50* (2006.01)

(52) U.S. Cl.
CPC ............ *G06T 5/006* (2013.01); *G06T 3/4038* (2013.01); *G06T 5/50* (2013.01); *G06T 2207/20224* (2013.01)

(58) Field of Classification Search
CPC .... G06T 3/40; G06T 5/00; G06T 5/50; G06T 17/05; G06T 3/00; G06T 3/20; G06K 9/62; H04N 1/387
See application file for complete search history.

(56) References Cited

U.S. PATENT DOCUMENTS

| | | | | |
|---|---|---|---|---|
| 5,982,951 | A * | 11/1999 | Katayama | H04N 5/23238 382/284 |
| 6,694,064 | B1 * | 2/2004 | Benkelman | G06V 20/13 382/284 |
| 9,245,201 | B1 * | 1/2016 | Jin | G06V 10/25 |
| 2013/0208997 | A1 * | 8/2013 | Liu | G06T 7/33 382/284 |
| 2020/0327642 | A1 * | 10/2020 | Saha | G06T 17/205 |
| 2021/0134055 | A1 * | 5/2021 | Verret | G06T 5/007 |
| 2021/0174471 | A1 * | 6/2021 | Kuang | G06T 5/009 |

FOREIGN PATENT DOCUMENTS

CN    110211043 A  *  9/2019

OTHER PUBLICATIONS

Chandelier, Laure, and Gilles Martinoty. "Radiometric aerial triangulation for the equalization of digital aerial images and orthoimages." Photogramm. Eng. Remote Sens 75.2 (2009): 193-200. (Year: 2009).*

Molina, et al., "A Polynomial Approach for Radiometric Aerial Triangulation", Proceedings of the International Calibration and Orientation Workshop, EuroCOW, 2010, 6 pages.

* cited by examiner

Primary Examiner — Li Liu
(74) Attorney, Agent, or Firm — Dorsey & Whitney LLP

(57) ABSTRACT

The presently disclosed subject matter includes a computerized method and system dedicated for reducing image artifacts and differences in an image mosaic and providing a smooth output image build from a collection of partially overlapping images. According to the disclosed technique image correction is applied on all regions of the corrected image and not only on overlapping regions between images.

20 Claims, 6 Drawing Sheets

RADIOMETRIC CORRECTION IN IMAGE MOSAICING

BACKGROUND

Since the field of view (FOV) of imaging devices is limited, mosaicing of several images is sometimes applied in order to obtain imaging over an area larger than a field of view of the imaging device. Radiometric differences between captured images present a challenge when attempting to obtain a high quality image (mosaic).

SUMMARY

The term "imaging device" as used herein should be broadly construed to include any type of a device operating for producing images according to any type of imaging technology, including for example, electro optic color or black & white camera, RADAR, Sonar, Computed Tomography (CT), Magnetic Resonance Imaging (MRI), etc.

One type of imaging device is Synthetic Aperture Radar (SAR). During SAR operation, images are captured by illuminating an area by radio waves and capturing the reflected waves to form an image. These images are sometimes captured over areas considerably larger than the SAR field of view. In such cases SAR image processing sometimes includes image mosaicing (or stitching) dedicated for generating an image of the captured area, larger than the field of view. For example, SAR is often mounted on aircraft or satellites, and used to recover high resolution terrestrial structure. SAR images are detailed enough to be used, in addition to various geographical applications, for monitoring infrastructures, agriculture, environmental issues, and for military intelligence. SAR images are prone to noise, and are often characterized by uneven reflection of illumination (e.g. radiance).

Additionally, in some implementations, SAR sensors normalize the images, showing areas of reflection relative to other parts of the same image. Therefore, naïve mosaicing of adjoining or partially overlapping SAR images, is characterized by mosaic artifacts, which may be noticeable to a greater degree at the boundaries between areas taken from different images.

The presently disclosed subject matter includes a computerized method of reducing image artifacts and differences in an image mosaic and providing a smooth output image build from a collection of partially overlapping images. According to the disclosed technique image correction is applied on all regions of the corrected image and not only on overlapping regions between images.

One advantage of the presently disclosed subject matter is that by applying correction to the entire image the corrected image is balanced and smooth over the entire image surface and does not sufferer from artifacts such as stitch-lines and blurring that may otherwise appear in overlapping areas and their margins.

The presently disclosed subject matter also enables to retain in the corrected image a pixel value ratio between an object of interest and background in the image as in the original image before correction. This enables to maintain the ability to detect features and objects in the image after correction.

The present disclosed subject matter include, using two types of sample points, one for the area overlapping between images (herein below "Radiometric Tie Points"; RTPs) and the other for the non-overlapping area (herein below "Radiometric Control Points"; RCPs).

According to one aspect of the presently disclosed subject matter there is provided a method of radiometric correction of a group of partially overlapping images captured by an imaging device, the method comprising:
using a processing circuitry for:
for each given image in the group of images:
determining a respective subset of overlapping images, each image in the subset having an area overlapping with the given image;
determining a first set of sampled points in the given image, each sampled point having a respective value (e.g. radiometric value);
determining a respective target value for each sampled point in the first set of sampled points, based on the respective value of the sampled point and values of homologous points in other images in the respective subset of overlapping images;
determining a second set of sampled points in non-overlapping areas in the given image;
determining a respective target value for each sampled point in the second set based on (e.g. equal) the respective value;
executing an optimization procedure comprising:
(i) for each sampled point i in the first set and the second set, calculating a respective difference $DP_i$ between the value of the sampled point and a respective target value, thereby generating a collection of difference values (DP);
(ii) fitting an optimized function (f) that approximates a respective data space of the difference values, and adding the optimized function to a function-group of the given image;
determining a correction function, based on the function-group; and
applying the correction function on the given image to thereby generate a respective corrected image.

In addition to the above features, the method according to this aspect of the presently disclosed subject matter can optionally comprise one or more of features (a) to (s) below, in any technically possible combination or permutation:
a) wherein the optimization procedure further comprises:
wherein (ii) is executed in case the collection of difference values does not comply with a certain condition (e.g. the sum of differences is greater than a certain threshold value);
and wherein (ii) further comprises:
i. using the optimized function (f) for calculating updated values of the first set of sampled points and the second set of sampled points;
ii. repeating the optimization procedure with the updated values of the first set of sampled points and the second set of sampled points.
b) wherein in case the collection of differences complies with the condition, ending the optimization procedure of the given image.
c) The method further comprising mosaicing two or more corrected images from the group of images to thereby generate a combined image.
d) wherein the correction function is a correction image, determining the correction function further comprises:
for each optimized function in the function-group, applying the optimized function to the respective given image to thereby generate a corresponding optimized image; and summing the corresponding optimized images to thereby generate the correction image.
e) wherein the optimized functions are quadratic polynomials.

f) wherein a filter is applied on sampling points.
g) wherein the filter is a Gaussian filter.
h) wherein the determining of the target values for at least part of the first set of sampled points includes calculating a respective point value as a weighted average based on the point value and homologous points.
i) wherein the determining of the target values for at least part of the first set of sampled points includes calculating a respective point value as a weighted average based on the point value and the proximal point values.
j) wherein the determining of the target values for at least part of the second set of sampled points includes calculating a respective weighted average based on the point value and proximal point values.
k) wherein the determining of the target values for at least part of the second set of sampled points includes calculating a respective weighted average based on the point value and proximal point values.
l) wherein the target values for a point in the second set of sampled points are respective point values.
m) wherein the target value for a point in the second set of sampled points is a weighted average based on the point value and values of proximal points.
n) wherein the images in the group are provided with associated geometric information, and the image mosaicing is executed in accordance with the associated geometric information.
o) wherein the images are provided with associated geometric information, and at least one overlapping area between an image and one or more other images is determined based on the associated geometric information.
p) wherein each point in the second set is assigned with a respective value calculated based on a plurality of proximal pixel values in a respective non overlapping area.
q) wherein the difference values are mapped to the given image, providing the data space of the difference values, the data space being a three dimensional data space corresponding to the given image.
r) wherein the optimized function (f) approximates the three dimensional data space.
s) where the corrected images combination is stored on a computer readable storage medium.

According to another aspect of the presently disclosed subject matter there is provided a computerized system configured to execute radiometric correction for a group of partially overlapping images captured by an imaging device; the computerized system comprises a processing circuitry configured to:
for each given image in the group of images:
determine a respective subset of overlapping images, each image having an area overlapping with the given image;
determine a first set of sampled points in the given image, each sampled point having a respective value;
determine a respective target value for each sampled point in the first set of sampled points, based on the respective value of the sampled point and values of homologous points in other images in the respective subset of overlapping images;
determine a second set of sampled points in non-overlapping areas in the given image;
determine a respective target value for each sampled point in the second set based on the respective value;
execute an optimization procedure comprising:
(i) for each sampled point i in the first set and the second set, calculate a respective difference $DP_i$ between the value of the sampled point and a respective target value, thereby generating a collection of difference values (DP);
(ii) fit an optimized function (f) that approximates a respective data space of the difference values, and adding the optimized function to a function-group of the given image;
determine a correction function, based on the function-group; and
apply the correction function on the given image to thereby generate a respective corrected image.

According to another aspect of the presently disclosed subject matter there is provided a non-transitory computer readable storage medium tangibly embodying a program of instructions that, when executed by a computer, cause the computer to perform a method of radiometric correction of a group of a partially overlapping group of images captured by an imaging device, the method comprising:
for each given image in the group of images:
determining a respective subset of overlapping images, each image having an area overlapping with the given image;
determining a first set of sampled points in the given image, each sampled point having a respective value;
determining a respective target value for each sampled point in the first set of sampled points, based on the respective value of the sampled point and values of homologous points in other images in the respective subset of overlapping images;
determining a second set of sampled points in non-overlapping areas in the given image;
determining a respective target value for each sampled point in the second set based on the respective value;
executing an optimization procedure comprising:
(i) for each sampled point i in the first set and the second set, calculating a respective difference $DP_i$ between the value of the sampled point and a respective target value, thereby generating a collection of difference values (DP);
(ii) fitting an optimized function (f) that approximates a respective data space of the difference values, and adding the optimized function to a function-group of the given image;
determining a correction function, based on the function-group; and
applying the correction function on the given image to thereby generate a respective corrected image.

According to another aspect of the presently disclosed subject matter there is provided a method of radiometric correction for image mosaicing of a group of partially overlapping images captured by an imaging device, the method comprising:
using a processing circuitry for:
for each given image in the group of images:
determining a respective subset of overlapping images, each image having an area overlapping with the given image;
determining a first set of sampled points in the given image, each sampled point having a respective value;
determining a respective target value for each sampled point in the first set of sampled points, based on the respective value of the sampled point and values of homologous points in other images in the respective subset of overlapping images;

determining a second set of sampled points in non-overlapping areas in the given image;

determining a respective target value for each sampled point in the second set based on the respective value;

executing an optimization procedure comprising:

for each sampled point i in the first set and the second set, calculating a respective difference $DP_i$ between the value of the sampled point and a respective target value, thereby generating a collection of difference values (DP);

in case the collection of difference values does not comply with a certain condition:

(i) fitting an optimized function (f) that approximates a respective data space of the difference value, and adding the optimized function to a function-group of the given image;

(ii) using the optimized function (f) for calculating updated values of the first set of sampled points and the second set of sampled points;

(iii) repeating the optimization procedure with the updated values of the first set of sampled points and the second set of sampled points.

determining a correction function, based on the function-group;

applying the correction function on the given image thereby generate a respective corrected image;

mosaicing two or more corrected images from the group of images to thereby generate a combined image.

The system, the method, and the non-transitory computer readable storage media disclosed herein according to various aspects, can optionally further comprise one or more of features (a) to (s) listed above, mutatis mutandis, in any technically possible combination or permutation.

BRIEF DESCRIPTION OF THE DRAWINGS

In order to understand the invention and to see how it may be carried out in practice, implementations will now be described, by way of non-limiting example only, with reference to the accompanying drawings, in which.

DETAILED DESCRIPTION

Figure 1:
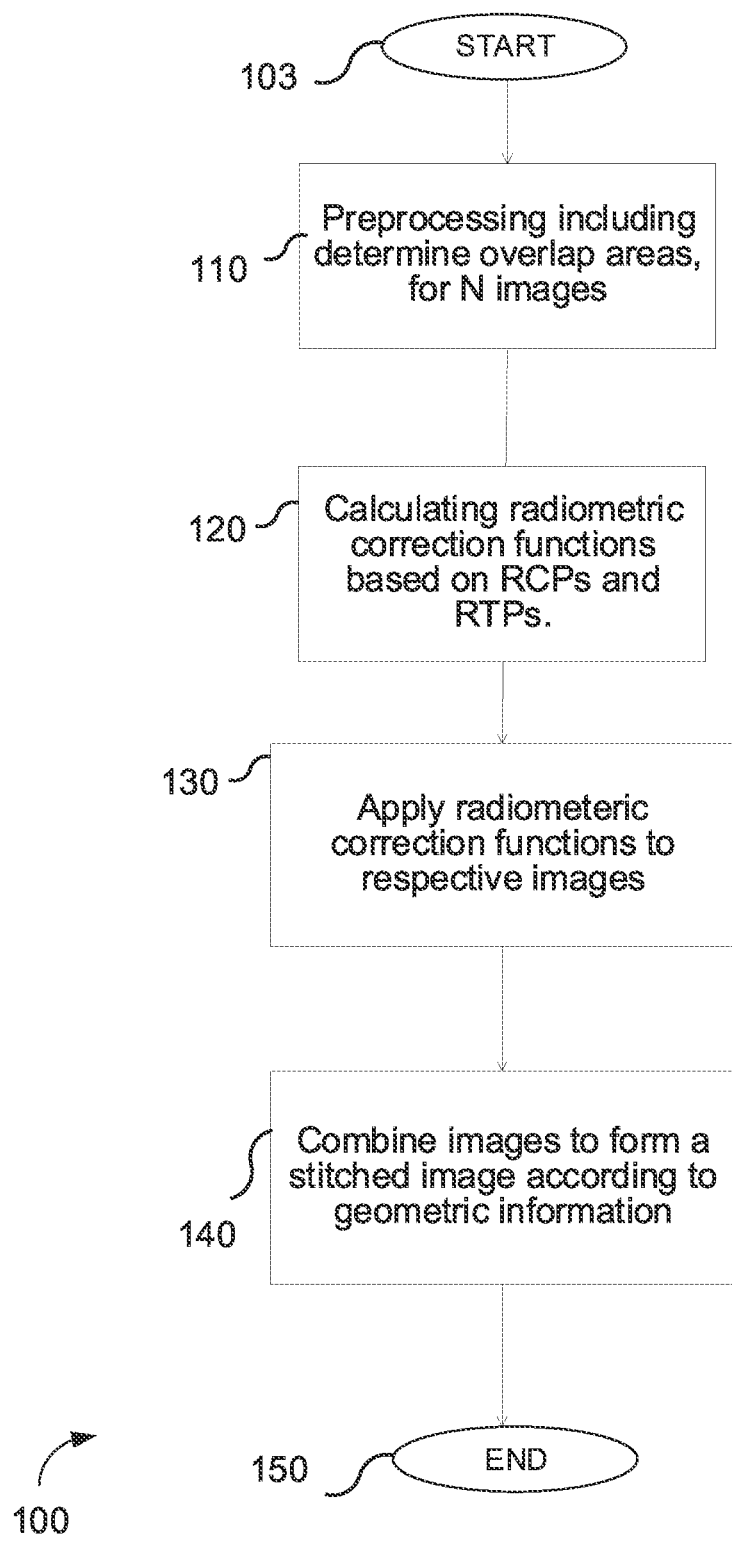
FIG. 1 illustrates a general flow chart of a process of radiometric correction in image mosaicing partially overlapping image groups, according to some examples of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, circuits and protocols have not been described in detail so as not to obscure the presently disclosed subject matter.

Unless specifically stated otherwise, as apparent from the following discussions, it is appreciated that throughout the specification discussions utilizing terms such as "executing", "determining", "receiving", "storing", "setting", "fitting", "calculating", "stitching", "mosaicing", or "applying" or the like, include action(s) and/or processes of a computer that manipulate and/or transform data into other data, said data represented as physical quantities, e.g. such as electronic or mechanical quantities, and/or said data representing the physical objects.

The term "computer", "computing device" or the like should be expansively construed to include any kind of hardware-based electronic device with a data processing circuitry (e.g. digital signal processor (DSP), a GPU, a TPU, a field programmable gate array (FPGA), an application specific integrated circuit (ASIC), microcontroller, microprocessor etc.). The processing circuitry can comprise for example, one or more processors operatively connected to computer memory, loaded with executable instructions for executing operations as further described below.

As will be further detailed with reference to the figures below, the processing circuitry can be configured to execute several functional modules in accordance with computer-readable instructions implemented on a non-transitory computer-readable storage medium. Such functional modules are referred to hereinafter as comprised in the processing circuitry.

The term "memory" used herein should be expansively construed to cover any volatile or non-volatile computer memory, storage device, or storage service, suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "an example", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

It is appreciated that any description of embodiments, methods, procedures, components or features of the presently disclosed subject matter, in the context of separate embodiments or examples, is done for better clarity only and may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

The operations in accordance with the teachings herein may be performed by a computer specially constructed for the desired purposes, or by a general-purpose computer specially configured for the desired purpose by a computer program stored in a non-transitory computer-readable storage medium.

Attention is now drawn to FIG. 1 that illustrates a flow chart of a process of radiometric correction in image mosaicing of a group of partially overlapping images, according to some examples of the presently disclosed subject matter. In some examples, process 100 can be performed by a processing circuitry designed according to the principles illustrated below with reference to FIG. 5, however the specific design provided with respect to FIG. 5 should not be construed as limiting, as other suitable designs can be likewise used.

According to the some examples, at the onset a group of N partially overlapping images (N: N>1) are received. In some examples, the images are received together with geometric information.

For the sake of clarity, the term "geometric information" is used herein to include geographic metadata or the sensor model or spatial information of the respective image. The geometric information can include for example, information such as: location (e.g. geo-location) of the one or more imaging devices capturing the images, the orientation of the imaging device, geographic coordinates of the image edges or boundaries, or other coordinates enabling to transform local image coordinates to other coordinate systems (e.g. to Earth-Centered, Earth-Fixed coordinates).

According to an example, at block 110 preprocessing is performed. The preprocessing includes calculating overlap regions for each image. For each given image in the group of images, overlapping images are identified. An overlapping image is one that has an overlapping region with the given image. The overlapping regions are mapped to the given image, thus giving rise to a respective subset of (M; M<N) overlapping images of the given image. In case of an image that does not have other overlapping images in the group of N images, the image is excluded from the remaining radiometric correction process.

According to some examples of the presently disclosed subject matter, the overlap area is identified using geometric information associated with the images in the subset of images. According to some examples, geometric information is used for determining boundaries of the area captured in each image, and thus the overlapping area between the images. According to some other examples, the geometric information includes the field of view corners, and overlapping images are identified by having at least one corner within the convex hull of the processed image corners. According to some examples, spatial pyramids, descriptors such as Scale-Invariant Feature Transform (SIFT) or Speeded-up Robust Features (SURF) matched by methods such as Random Sample Consensus (RANSAC), neural networks, or other computer vision methods, may be practiced to obtain or calibrate geometric information, and, based on this information, to collocate homologous points (points located at corresponding locations) in different overlapping images.

It is noted that that various other methods of determining overlap areas between different images or rectangles, whether aligned or unaligned, or of the same or different size, are well known in the art, and accordingly are not described herein in detail.

At block 120 images in the group are processed to obtain one or more respective optimized functions (e.g. polynomial) for the radiometric correction. According to some examples, this block is related to two main operations, determination of two sets of sampled points (Radiometric Tie Points, namely RTPs and Radiometric Control Points, namely RCPs), and optimization of one or more functions based on these points, giving rise to a function-group. A more detailed description of examples of the processing are provided below with reference to FIG. 2.

According to some examples, the processing comprises finding an optimized function for each image based on matching radiometric values (e.g. gray level) of target points (RTPs) in overlapping regions with other images, and maintaining radiometric values in control points (RCPs) in the non-overlapping areas. An optimized function, $f(P_x, P_y, P_{value})$ is a function that may be applied to an image as a means to match its radiometric values with the radiometric values of other images, enabling, for example, seamless visualization of stitched images, containing parts from more than one image. In some examples the optimized function is stored as an image and added to the original image, however the presently disclosed subject matter is not limited thereby.

At block 130 radiometric correction functions generated based on the respective optimized functions, are applied on images, producing corrected images. A more detailed description of examples of the correction function application is provided below with respect to FIG. 6.

At block 140 two or more corrected images are combined, or stitched together to provide a combined image, corresponding to a field of view that is different than the field of view of the imaging device, e.g. a customized field of view, a larger field of view such as a panoramic imaging. The combined image is a radiometrically balanced mosaic. The corrected images can be displayed on a display device, printed, transmitted to a storage unit, or post processed by other methods. According to some examples, as further explained below, mosaicing is based on geometric information. According to some examples a homography is applied to the image, fitting its corners to the intersection points between rays representing the field of view corners and the object plane. According to some examples, the corrected images are projected onto an area determined by their given corner location within a larger frame consecutively. According to a further example, the corrected images are projected onto a common mosaic plane. It is noted that various other methods of projecting images on geometric surfaces, aligned or unaligned, of the same or different size, are well known in the art and accordingly are not described herein in detail. Block 150 marks the process ending.

Figure 2:
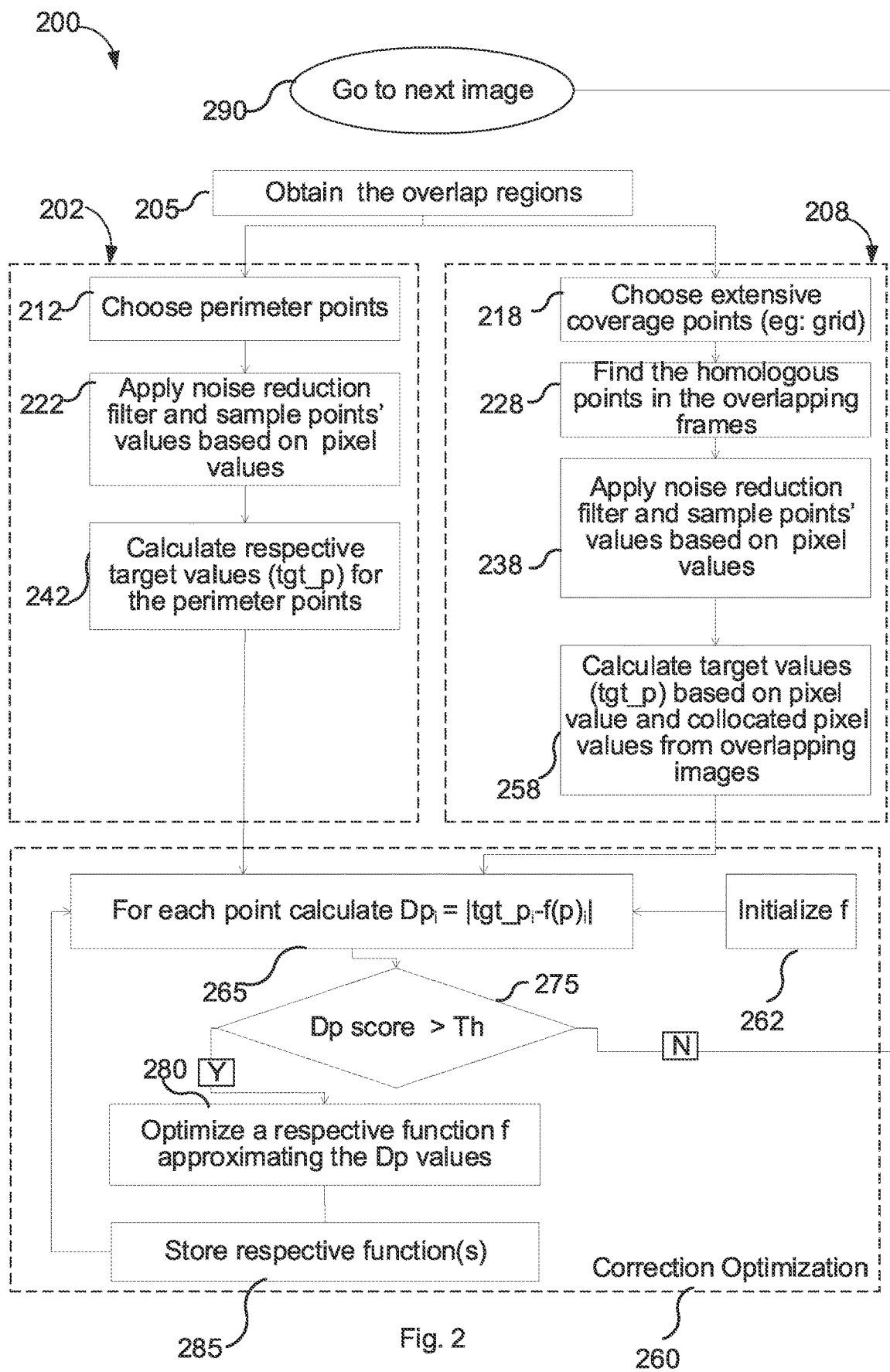
FIG. 2 illustrates a flow chart of a process performed per image in the group, according to some examples of the presently disclosed subject matter.

Turning now to FIG. 2, this illustrates a flow chart showing an example of the processing performed per given image in the group as mentioned above with respect to block 120.

For each given image (currently processed), the overlapping regions in the image (i.e. a region overlapping with at least one other image in the respective subset of overlapping images; block 205) is processed accordingly to the overlap flow 208, and the rest of the image (non-overlapping) is processed according to the non-overlap flow 202. Processes 202 (RCP generation procedure) and 208 (RTP generation procedure) can be executed simultaneously or sequentially.

Figure 3:
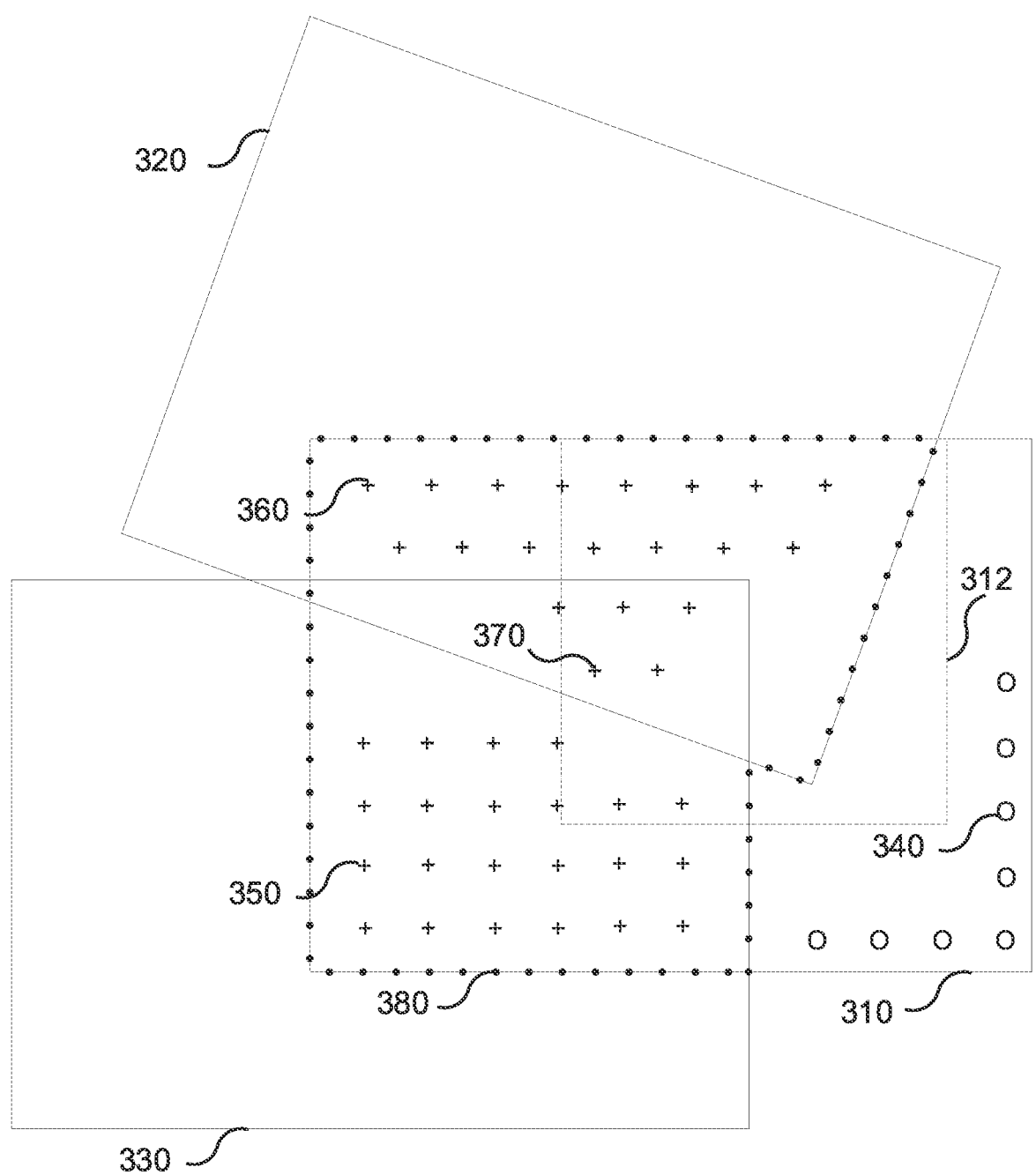
FIG. 3 illustrates, schematically, determination of sampled points: Radiometric Tie Points (RTP) and Radiometric Control Points (RCP), according to some examples of the presently disclosed subject matter.
Figure 3:

At block 218 extensive coverage points are determined. Extensive coverage points (also referred to herein as the first set of sampled points, "Radiometric Tie Points", or RTP in short) are a collection of points determined from the total points in an overlapping area, which are used for balancing radiometric values between different images as explained further below. Reference is made to FIG. 3 which is a schematic illustration of overlapping images demonstrating certain principles disclosed herein showing RTPs denoted 350, 360 and 370.

At block 212 perimeter points are determined. Perimeter points (also referred to herein as the second set of sampled points, "Radiometric Control Points", or RCP in short) are a collection of points determined from the total points located along or near the perimeter of the given image in the non-overlapping area. RCPs are schematically illustrated in FIG. 3 denoted as 340.

FIG. 3 shows image 310, being the currently processed image and having regions overlapping with two other images, 320 and 330. The area of image 310 is partitioned into two regions, an overlapping region (marked by the dotted line 380) and a non-overlapping region (the area of image 310 excluding 380). In general RTPs can be determined as a collection of points that are distributed substantially evenly over the overlapping area.

According to one example, RTPs are points on a grid superimposed on the image, the grid indicating a fixed (or a substantially fixed) distance between the points. RTPs are schematically indicated in FIG. 3 by a plus sign. RTP 350 is an example of an RTP included both in the currently processed image 310 and one other image 330. RTP 360 is another example of an RTP included both in the currently processed image 310 and one other image 320. RTP 370 is yet another example of an RTP included in the currently processed image 310 and two other images 320 and 330. An example of a calculation of the RTPs values is demonstrated below with reference to FIG. 4.

According to some examples, the RCPs are determined as a collection of points that are substantially evenly distributed along parts of the processed image perimeter, where these parts are outside the areas overlapping other images in the subset (i.e. "non-overlapping areas"). According to some examples, RCPs are points at the perimeter of a grid superimposed on the currently processed image 310, whose distance from the overlap area 380 exceeds a threshold. The RCPs are schematically indicated by a circle, and 340 is an example of an RCP.

The dashed line 312 indicates an example of a feature appearing in one or more of the processed images. This feature was added to the drawings for better understanding of the translation transformations, with or without rotation (which are simple, special cases of homographic transformations), which give rise to relative placement of homologous points in different images in the subset. The area marked in 312 can, for example be characterized by a different albedo than of the rest of the image. FIG. 3 also illustrates an example of a rectangular grid superimposed on image 310 which is triangular grid relative to images 320 and 330.

Reverting to FIG. 2, at block 228 homologous points of the RTPs are found. The homologous points are overlapping points in different images in the respective subset of the given image, having the same (or substantially the same) global location, each point having a translated local location in its respective image coordinates.

Figure 4:
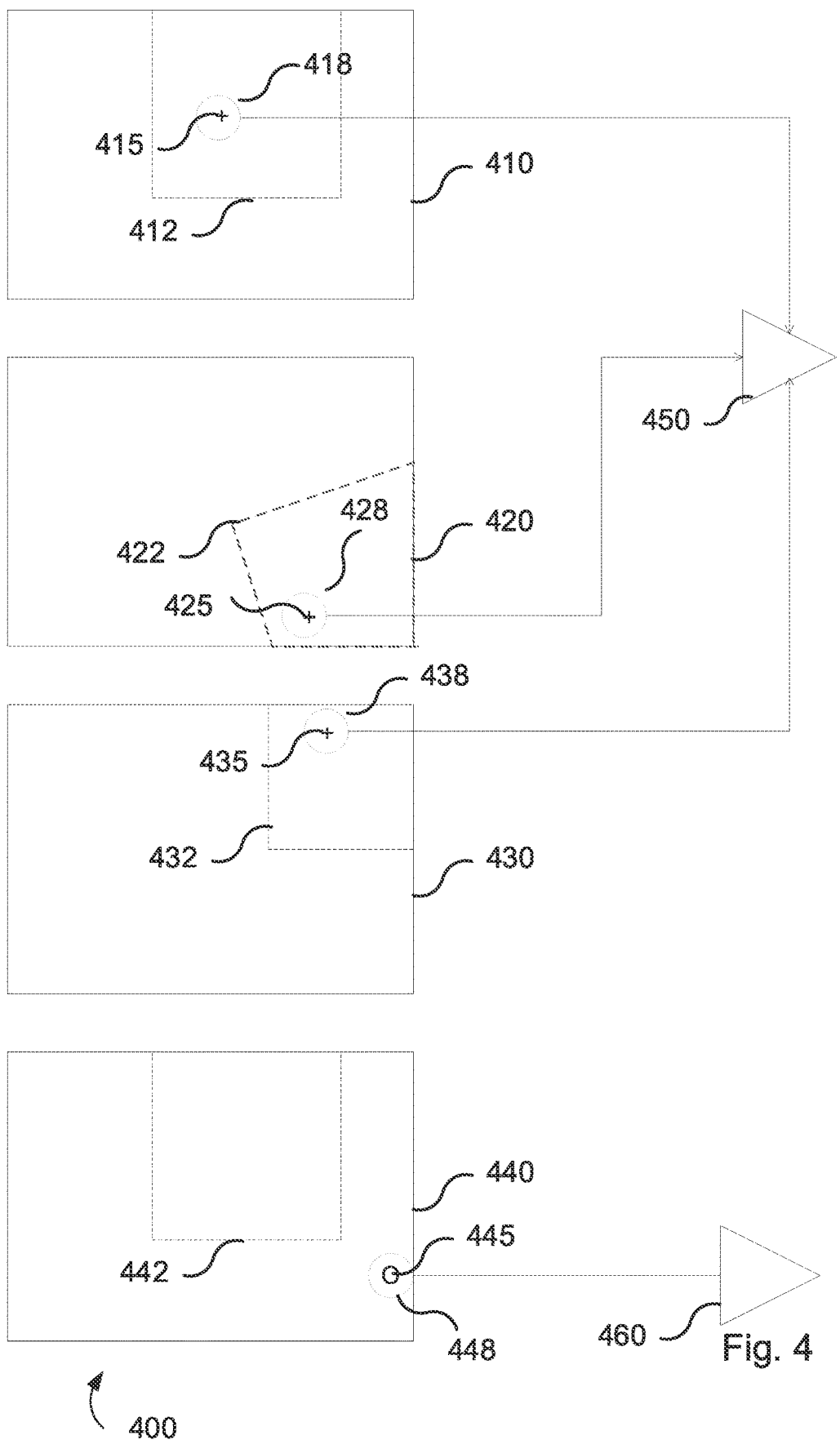
FIG. 4 illustrates, schematically, target value calculations for a Radiometric Tie Points (RTP) and Radiometric Control Points (RCP), according to some examples of the presently disclosed subject matter.

An example of a point's homologous point set is illustrated in FIG. 4. According to some examples the homologous point calculations are made by applying homographic transformations determined based on the associated geometric information. Methods of performing these calculations or equivalents are well known to those versed in the art. According to other examples this process can be done using feature extraction and matching, which are also known in the art. Accordingly, these methods are not described herein in detail.

In some cases the images may have poor signal to noise ratio. Accordingly, a filtering process 222, 238 can be applied to sampled points (RCPs and RTPs) respectively in order to reduce the effect of the noise on the calculation. Details on possible filtering methods are described with reference to FIG. 4.

According to some examples, at blocks 242 and 258 a target value (tgt_p) for each RCP and RTP in the given image is determined, respectively. According to some examples, the setting of a tgt_p value of a given ($i^{th}$) RCP in the given image is based on the pixel value of the given ($i^{th}$) RCP, e.g. tgt_p$_i$ of RCP$_i$=pixel value of RCP$_i$ (where i is an index assigned to RCPs and RTPs, each index i having a corresponding point location $P_x$, $P_y$).

According to some examples, calculation of a tgt_p value of a given ($i^{th}$) RTP in the given image (the given image having a respective subset S, that includes 1 . . . J ($1 \le J \le S-1$) overlapping images that have each a homologous point for RTP$_i$) is based on pixel values of the given RTP$_{i,j}$ (RTP i in image j) and its homologous points in other overlapping images (sharing the same i value and a different j value), e.g. based on a mean value of the point and its homologous points. An example of homologous points located by a homography (based on geometric information) is illustrated in FIG. 4. According to some examples, homologous points are located by a sensor model or by the geographic information. The calculations of tgt_p values give rise to a three dimensional data space corresponding to the given image, where the first two dimensions are the point's coordinates, and the third is the value. Attention is now reverted to the Optimization procedure 260, where a function f(P) is optimized. f(P) is the function f($P_x,P_y,P_{value}$)=$P_{new}$, where $P_{new}$ is the corrected pixel value (e.g. gray level) of a point P in the corrected image, $P_x$ is the x coordinate of P and $P_y$ in they coordinate of P.

According to some examples, procedure 260 starts with a function initialization operation, (block 262). Initialization can be done using the original sampled points, for instance identity function, f($P_x,P_y$)=$P_{value}$. According to some examples, block 262 initializes the function-group.

According to some examples, at block 265 a difference value (Dp$_i$) between f(P) and tgt_p is calculated for each sampled point (RCPs and RTPs) in the currently processed image. It is noted that the calculated difference represents a difference between the radiometric value of a point in the current image (or the updated sampled point value once the function-group comprises functions other than the identity function) and the target value, which may relate to radiometric value of homologous points in other images for RTPs, and the difference from the original value (initially 0) for RCPs. Similarly to tgt_p, Dp values give rise to a three dimensional data space corresponding to the given image, where the first two dimensions are the point's coordinates, and the third is the difference value.

A score, Dp score (e.g. Dp score=$\Sigma|Dp_i|$) is calculated based on the differences and compared to a threshold value (block 275). The threshold value can be chosen based on engineering considerations, and may depend on implementation details such as application or display properties. The score can be calculated for example as a sum or mean of the differences calculated for sampled points (RTPs and RCPs).

In case the score exceeds the threshold value, a function is optimized in order to reduce the score value of the current image and thus optimize the function (block 280).

According to some examples, a polynomial function is estimated (e.g. two dimensional quadratic polynomial), by fitting the function to the Dp values of the image calculated for the sampled points (RCPs and RTPs) of the image as explained above with reference to block 265. The performed fitting is an optimization of the polynomial coefficients to best fit to the Dp values. The optimized function f (e.g. polynomial) of the respective image is added to the function-group and stored in a data-repository for later use (block 285).

According to some examples, updated sampled point values are calculated in block 265, based on the original sampled point values, and one or more functions in the function-group. In one example, the updated value of an $i^{th}$ sampled point is equaled to its last value+ the estimated point value provided by the optimization function f(Pi).

According to some examples, functions or their polynomial coefficients are optimized by methods such as gradient descent which are well known to those versed in the art.

Procedure 260 returns to block 265, where a new score is calculated using the new (optimized) function f. The sequence of operations described with reference to blocks 265, 275, 280 and 285 is repeated until the Dp score is below the threshold. In each iteration the function is optimized to better fit the updated Dp values. It should be noted that many optimization methods can be referred to as fitting, however the presently disclosed subject matter is not limited to any specific method.

In case the Dp score is smaller than the threshold value, the optimization procedure of the current image is complete and the process continues to the next image in the group of N overlapping images.

The output of procedure 260 includes a collection of one or more optimized functions for each respective image in the group of images, also referred to herein as "a function-group". As further explained below, a function group of a respective image is used for generating a corresponding correction function for that image. It can be noted, that in the trivial case where no optimization was made (the processed image did not need correction) a function of identity may be the only optimized function associated with the image.

Attention is now drawn to FIG. 4 schematically illustrating an example of receptive fields and target value setting, as done in block 238, for RTPs, and, as done in block 222, for RCPs. The example shown in FIG. 4 has reference to RTP 370 and RCP 340 in FIG. 3.

The currently processed image 310 is shown twice for clarity as 410 in the RTP calculation and 440 in the RCP calculation. The partially overlapping images 320 and 330 are shown as 420 and 430 respectively. The point 370 is shown as 415, and its homologous points in the partially overlapping images 420 and 430 are 425 and 435, respectively.

The dashed lines 412, 422, 432, and 442 indicated in the images 410, 420, 430, and 440, respectively, refer to the same feature indicated by reference numeral 312 in FIG. 3. The feature added illustrates the effect of the homographic transformation on locations of objects (e.g. features and points) within other images.

Turning to filter description, two related aspects of their characteristics are discussed in accordance with the description of FIG. 4. Filter shapes relate to the weight distribution between elements (e.g. pixels). Some filter implementations may have negative weights assigned to one or more elements. According to some examples, the noise reduction filter may be implemented calculating each point value based on a plurality of proximal pixel values in the same given image in the overlapping area, e.g. a Gaussian filter around the point. Another example could be a weighted average of the pixel value and its immediate neighbors. According to some examples, the noise reduction filter may be triangular. According to other examples, the noise reduction filter may be square, attributing equal weight to pixels in its receptive field.

Another aspect of filters is its receptive field. The filter's receptive field includes all the elements (e.g. pixels), whose weight is not zero.

It is noted that the theoretical receptive field of a two-dimensional Gaussian filter applied on a point, is the entire image, however, since practical implementations may ignore values below some threshold, the practical field of view of filters may be considered circular. It is also noted that filters may be applied to entire images, segments thereof, or at specific points, as preferred by engineering considerations.

According to some examples, point value is calculated based on a plurality of proximal pixel values in the same given image. The circles 418, 428, 438, and 448 mark examples of receptive fields applying a function of pixel values. In these examples, the points inside the circles may be considered the proximal points with reference to the respective point.

According to some examples, the value may be the mean of its immediate neighbor pixel value. According to other examples, the receptive field may be rectangular, (e.g. square), or characterized by an arbitrary shape. According to other examples, the field of view may include distant points.

According to some examples, the image is convolved with one or more filters, and filtered values are readily available at the resulting image. According to other examples, the calculation is performed separately on points of interest, which may include for example RCPs, RTPs or their homologous points.

The filtering and function output 450 calculates tgt_p for RTPs according the value of pixels in the receptive field associated with the point and its homologous points. In the illustrated example the receptive field 418 associated with the point 415, is taken together with the receptive fields 428, and 438 associated with the homologous points 425 and 435 respectively. According to some examples, tgt_p is a weighted average of the receptive fields, attributing greater weight to pixels close to the points.

The function 460 calculates tgt_p for RCPs according to the value of pixels in the receptive field associated with the point. In the illustrated example, the receptive field 448 associated with the respective point 445, is taken. According to some examples tgt_p is a weighted average of the receptive field, attributing greater weight to pixels close to the point. According to some examples, the weight distribution applied between RTPs' receptive fields is substantially equal, however the presently disclosed subject matter is not limited thereby.

Figure 5:
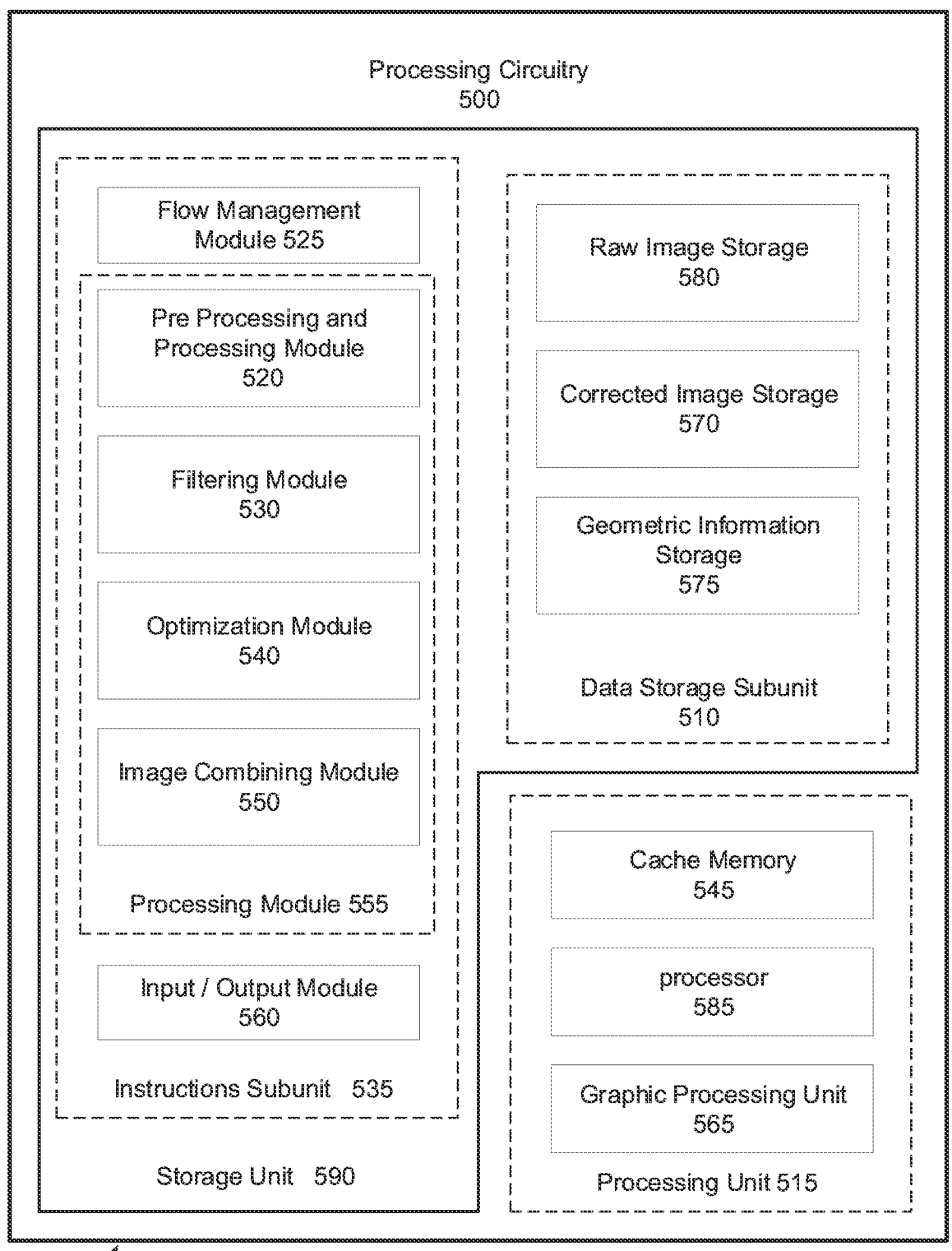
FIG. 5 illustrates, schematically, an architecture of a processing circuitry, according to some examples of the presently disclosed subject matter.

Turning now to FIG. 5, this schematically illustrates an example of a radiometric correction system for image mosaicking implemented on hardware computing device. FIG. 5 shows processing Circuitry 500 that comprises Storage Unit 590 and Processing Unit 515. The Processing Unit includes for example one or more computer processors used to execute the modules of the radiometric correction system. Processing unit 515 can include for example, processor 585 such as CPU, and may also include hardware optimized for high performance image processing such as Graphic Processing Unit 565 (GPU, DSP, TPU etc.). According to some examples, Cache Memory 545 is used as a proxy to accelerate fetching data and instructions from the Storage Unit 590, and storing data therein.

According to some examples, the Storage Unit 590 comprises two main subunits, the Data Storage Subunit 510 and the Instruction (or code) Subunit 535.

According to some examples, the Instruction Subunit 535 comprises several modules to be executed in run time by one or more processors (585, 565). According to some examples, Flow Management Module 525 controls when, on which computer or component thereof, and on what data the modules should be applied, and may be used to determine parameters and other operative aspects. According to some examples, operation of Input/Output Module 560 includes controlling reception of images and their geometric information, and outputting radiometrically balanced mosaic or radiometrically corrected images or parts thereof to one or more storage devices, display, printer, a post processing system, or the like.

According to some examples, the Instruction Subunit 535 comprises Correction module 555. According to some examples, Correction module 555 comprises instructions that, when executed, perform operations of the process as described above with reference to FIGS. 1 and 2.

In some examples, Preprocessing and Processing Module 520 is configured to determine overlapping areas between images in a group of images, and determine RTPs in the overlapping areas and RCPs in the non-overlapping areas, as described above with reference to blocks 110 and 120 in FIG. 1.

In some examples, Filtering Module 530 is configured to execute filtering as mentioned in blocks 222 and 238 in FIG. 2, and described above with reference to FIG. 4.

According to some examples, Optimization Module 540 is used to determine the optimized functions for images and approximate the radiometric differences within an image, or between it and other images, as explained above with reference to FIG. 2. The Image Combining Module 550 is a method to combine, mosaic, or project images according to their geometric information, to form a radiometrically balanced image which represents a larger field of view, as mentioned above with reference to block 140 in FIG. 1. The Image Combining Module also applies the correction function with reference to FIG. 6 (as detailed below) and block 130 in FIG. 1.

According to some examples, the Data Storage Unit 590 comprises a Raw Image Storage 580, used to store the raw images, before processing and correction. Furthermore, according to some examples, the interim and processed images, and associated optimized and correction functions, are stored in the Corrected Image Storage 570. Furthermore, according to some examples, the associated geometric information is stored in the Geometric Information Storage 575. According to some examples, the means of displaying images can access the Data Storage Unit.

Figure 6:
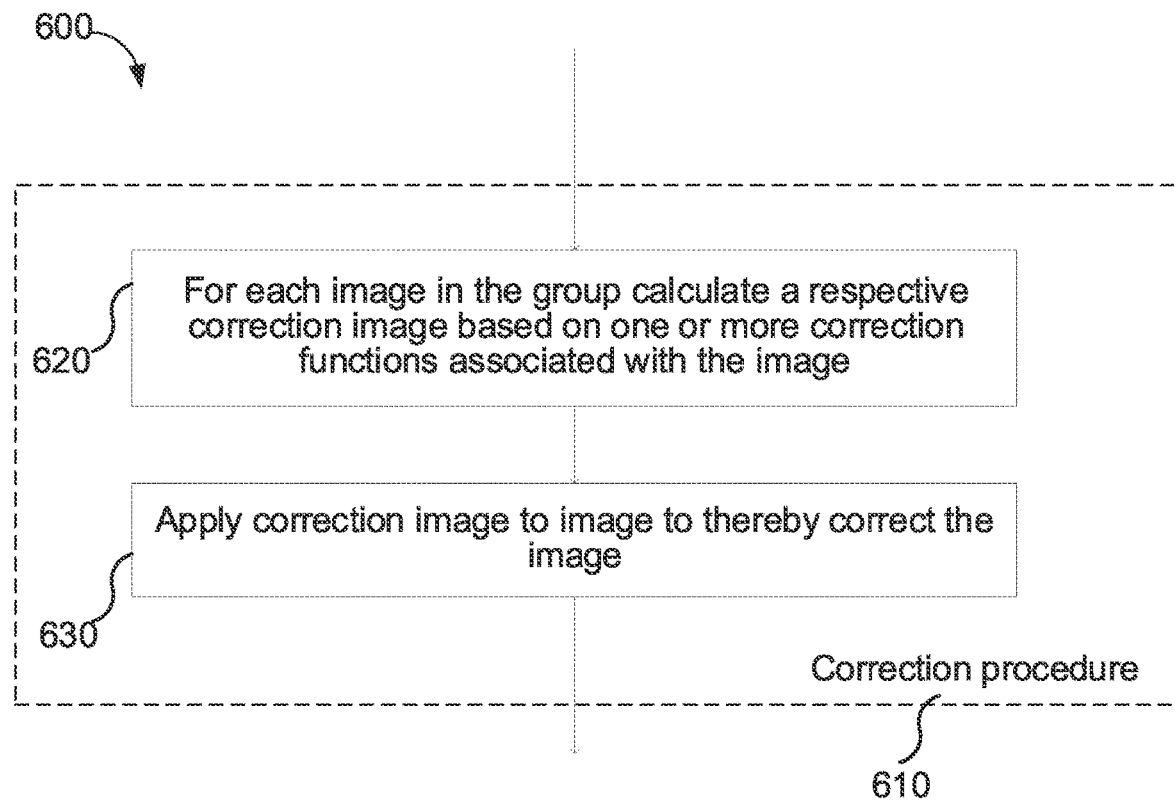
FIG. 6 illustrates, schematically, an image correction procedure, according to some examples of the presently disclosed subject matter.

Turning now to FIG. 6, this illustrates a flow chart showing an example of the image correction procedure (610) as mentioned above with respect to block 130.

In general, as explained above with reference to FIG. 2, a collection of functions are obtained for each given image in each subset in the group of images. From the collection of functions, a correction function (or correction image) is generated for the image.

According to some examples, a correction image $M_j$ is calculated at block 620 for each respective image $I_j$, where j ranges from 1 to N (N being the number of images in the group). According to some examples, correction image $M_j$ is calculated according to one or more respective optimized functions ($f_{j1}$ ... $f_{jk}$, where k denotes the number of optimized functions associated with the image $I_j$, k being the number of functions per image $I_i$).

According to one example, the optimized functions are functions of the coordinates, for example:

$$M_j = \Sigma_{l=1}^k \Sigma_{x=1}^{cols} \Sigma_{y=1}^{rows} f_{j1}(P_x, P_y)$$

Where cols and rows refer to the size of image.

Notably, various methods which are known in the art can be used in order to improve efficiency of calculation and implementation of the image correction, e.g. by applying bilinear interpolation on the image by using grid, etc.

Alternatively, rather than a correction image, one or more respective optimized functions (f j1 ... fjk, j denotes the image number, k denotes the number of optimized functions associated with the image Ij) as found by the optimization procedure (260 in FIG. 2) giving rise to a correction function, Fj (Px,Py). According to one example, the correction function is a summation of the respective optimized functions calculated for an image Ij, for example:

$$F_j(Px, Py) = \Sigma_{l=1}^k f_{j1}(P_x, P_y)$$

According to another example, the correction function is a chaining of the respective optimized functions calculated for an image $I_j$, for example:

$$F_j(Px, Py) = f_{j2}(f_{j1}(P_x, P_y))$$

At block 630 the correction image or function is applied to its corresponding image to thereby correct radiometric inconsistencies between images in the group.

According to some other examples, the correction images $M_1 \ldots _n$ are applied on the respective images $I_1 \ldots _n$. According to some examples $I_{iNew} = M_i + I_i$, as $M_i$ may be a prediction of the radiometric differences.

According to other examples, $I_{jNew} = M_i$ as $M_i$ may already contain the information from the pixel values in P.

According to other examples, where a respective radiometric correction function is $F_j(P_x, P_y)$, the function is applied to a corresponding image $I_j$.

According to yet other examples, $I_{jNew} = F_j(I)$.

According to some examples, corrected images are stored in the Corrected Image Storage (570 in FIG. 5) for later use e.g. by projection module 140.

As explained above with respect to block 140 in FIG. 1, the corrected images can be combined to generate a balanced radiometric mosaic image from the image in the group.

As used herein, the term fitting may refer to one or more deterministic or stochastic optimization methods, which finds values of a set of variables which minimizes or maximizes an objective function of these variables, constraints, and possibly other parameters. As an example, gradient descent can be used to find the coefficients of a second order polynomial which approximates the brightness difference between a set of points in an image.

It is to be understood that when specific formulae, coefficients, grids, and/or filters shapes are given herein, they are meant to include a range of values acceptable within practical tolerances known in the pertinent field. Furthermore, for the sake of clarity, the term "substantially" or "approximately" is used herein to imply the possibility of variations in formulae, coefficients, and/or filters within an acceptable range, or which are known to be interchangeable in some implementations. According to one example, the term "substantially" used herein should be interpreted to imply possible variation of up to 15% over or under any specified value. According to another example, the term "substantially" used herein should be interpreted to imply possible variation of up to 10% over or under any specified value. According to yet another example, the term "substantially" used herein should be interpreted to imply possible variation of up to 5% over or under any specified value. According to a further example, the term "substantially" used herein should be interpreted to imply possible variation of up to 2.5% over or under any specified value.

Additionally, for the sake of clarity, the term "proximal" is used herein to imply the possibility of variations in relative location, in which some preference is given to pixels or points in relative proximity to the reference point, within an acceptable range, or which are known to be interchangeable in some implementations. According to one example, proximal pixels or points may include the points inside an elliptical around the reference point. According to another example, the set of pixels which are immediate neighbors of a pixel may be considered the proximal points. According to yet another example, points may be chosen randomly with probability inverse to their distance from the reference point.

Furthermore, the term "summation" as used herein should be broadly construed to include any possible variation of signed or absolute value operation of summation known in the pertinent field, or any other operation accepted as a practical alternative to summation.

Additionally, the term "weighted average" as used herein should be broadly construed to include any possible variation of weight assignment, or any other operation accepted as a practical alternative to summation. Equal weight assignment, i.e. mean, is one example of a weighted average.

The subject matter of the present invention has been described with a certain degree of particularity, but those versed in the art will readily appreciate that the invention is not thus limited. Numerous modifications, changes and improvements within the scope of the invention will now occur to the reader.

The invention claimed is:

1. A method of radiometric correction of a group of partially overlapping images captured by an imaging device, the method comprising:
   using a processing circuitry for:
   for each given image in the group of images: determining a respective subset of overlapping images, each image having an area overlapping with the given image; determining a first set of sampled points in the given image, each sampled point having a respective value;
   determining a respective target value for each sampled point in the first set of sampled points, based on the respective value of the sampled point and values of homologous points in other images in the respective subset of overlapping images;
   determining a second set of sampled points in non-overlapping areas in the given image;
   determining a respective target value for each sampled point in the second set based on the respective value;
   executing an optimization procedure comprising:
   (i) for each sampled point i in the first set and the second set, calculating a respective difference $DP_i$ between the value of the sampled point and a respective target value, thereby generating a collection of difference values (DP);
   (ii) fitting an optimized function (f) that approximates a respective data space of the difference values, and adding the optimized function to a function-group of the given image;
   determining a correction function, based on the function-group;
   applying the correction function on the given image to thereby generate a respective corrected image.

2. The method of claim 1, wherein the optimization procedure further comprises:
   and wherein (ii) further comprises:
   a. using the optimized function (f) for calculating updated values of the first set of sampled points and the second set of sampled points;
   b. repeating the optimization procedure with the updated values of the first set of sampled points and the second set of sampled points.

3. The method of claim 2, wherein in case the collection of differences complies with the condition, ending the optimization procedure of the given image.

4. The method of claim 1 further comprising, mosaicing two or more corrected images from the group of images to thereby generate a combined image.

5. The method of claim 1, wherein the correction function is a correction image, the determining the correction function further comprises:
   for each optimized function in the function-group, applying the optimized function to the respective given image to thereby generate a corresponding optimized image; and summing the corresponding optimized images to thereby generate the correction image.

6. The method of claim 1, wherein the determining of the target values for at least part of the first set of sampled points includes calculating a respective point value as a weighted average based on at least one of:
   i. the point value and homologous points; and
   ii. the point value and proximal point values.

7. The method of claim 1, wherein the determining of the target values for at least part of the second set of sampled points (RCP) includes calculating a respective weighted average based on the point value and proximal point values.

8. The method of claim 1, wherein the determining of the target values for at least part of the second set of sampled points includes calculating a respective weighted average based on the point value and proximal point values.

9. The method of claim 1, wherein the target values for a point in the second set of sampled points are respective point values.

10. The method of claim 1, wherein the target value for a point in the second set of sampled points is a weighted average based on the point value and values of proximal points.

11. The method of claim 1, wherein the images in the group are provided with associated geometric information, and the image mosaicing is executed in accordance with the associated geometric information.

12. The method of claim 1, wherein the images are provided with associated geometric information, and at least one overlapping area between an image and one or more other images is determined based on the associated geometric information.

13. The method of claim 1, wherein each point in the second set is assigned with a respective value calculated based on a plurality of proximal pixel values in a respective non overlapping area.

14. The method of claim 1, wherein the difference values are mapped to the given image, providing the data space of the difference values, the data space being a three dimensional data space corresponding to the given image.

15. A method of radiometric correction for image mosaicing of a group of partially overlapping images captured by an imaging device, the method comprising:
   using a processing circuitry for:
   for each given image in the group of images:
   determining a respective subset of overlapping images, each image having an area overlapping with the given image;

determining a first set of sampled points in the given image, each sampled point having a respective value;

determining a respective target value for each sampled point in the first set of sampled points, based on the respective value of the sampled point and values of homologous points in other images in the respective subset of overlapping images;

determining a second set of sampled points in non-overlapping areas in the given image;

determining a respective target value for each sampled point in the second set based on the respective value;

executing an optimization procedure comprising:

for each sampled point i in the first set and the second set, calculating a respective difference $DP_i$ between the value of the sampled point and a respective target value, thereby generating a collection of difference values (DP);

in case the collection of difference values does not comply with a certain condition:

(i) fitting an optimized function (f) that approximates a respective data space of the difference value, and adding the optimized function to a function-group of the given image;

(ii) using the optimized function (f) for calculating updated values of the first set of sampled points and the second set of sampled points;

(iii) repeating the optimization procedure with the updated values of the first set of sampled points and the second set of sampled points;

determining a correction function, based on the function-group;

applying the correction function on the given image to thereby generate a respective corrected image;

mosaicing two or more corrected images from the group of images to thereby generate a combined image.

16. A computerized system configured to execute radiometric correction for a group of partially overlapping images captured by an imaging device; the computerized system comprises a processing circuitry configured to:

for each given image in the group of images:

determining a respective subset of overlapping images, each image having an area overlapping with the given image;

determine a first set of sampled points in the given image, each sampled point having a respective value;

determine a respective target value for each sampled point in the first set of sampled points, based on the respective value of the sampled point and values of homologous points in other images in the respective subset of overlapping images;

determine a second set of sampled points in non-overlapping areas in the given image;

determine a respective target value for each sampled point in the second set based on the respective value;

execute an optimization procedure comprising:

(i) for each sampled point i in the first set and the second set, calculate a respective difference $DP_i$ between the value of the sampled point and a respective target value, thereby generating a collection of difference values (DP);

(ii) fit an optimized function (f) that approximates a respective data space of the difference values, and adding the optimized function to a function-group of the given image;

determine a correction function, based on the function-group; and apply the correction function on the given image to thereby generate a respective corrected image.

17. The system of claim 16, wherein the processing circuitry is further configured, as part of the optimization procedure, to:

execute (ii) in case the collection of difference values does not comply with a certain condition;

and wherein execution of (ii) further comprises:

a. using the optimized function (f) for calculating updated values of the first set of sampled points and the second set of sampled points;

b. repeating the optimization procedure with the updated values of the first set of sampled points and the second set of sampled points.

18. The system of claim 17, wherein the processing circuitry is configured, in case the collection of differences complies with the condition, to end the optimization procedure of the given image.

19. The system of claim 16, wherein the processing circuitry is further configured to mosaic two or more corrected images from the group of images to thereby generate a combined image.

20. A non-transitory computer readable storage medium tangibly embodying a program of instructions that, when executed by a computer, cause the computer to perform a method of radiometric correction of a group of partially overlapping group of images captured by an imaging device, the method comprising:

for each given image in the group of images:

determining a respective subset of overlapping images, each image having an area overlapping with the given image;

determining a first set of sampled points in the given image, each sampled point having a respective value;

determining a respective target value for each sampled point in the first set of sampled points, based on the respective value of the sampled point and values of homologous points in other images in the respective subset of overlapping images;

determining a second set of sampled points in non-overlapping areas in the given image;

determining a respective target value for each sampled point in the second set based on the respective value;

executing an optimization procedure comprising:

(i) for each sampled point i in the first set and the second set, calculating a respective difference $DP_i$ between the value of the sampled point and a respective target value, thereby generating a collection of difference values (DP);

(ii) fitting an optimized function (f) that approximates a respective data space of the difference values, and adding the optimized function to a function-group of the given image;

determining a correction function, based on the function-group; and applying the correction function on the given image to thereby generate a respective corrected image.

* * * * *